United States Patent
Shah et al.

(10) Patent No.: US 10,762,287 B2
(45) Date of Patent: Sep. 1, 2020

(54) EDOC UTILITY USING NON-STRUCTURED-QUERY-LANGUAGE DATABASES

(71) Applicant: Bank of America Corporation, Charlotte, NC (US)

(72) Inventors: Anuj Shah, Jersey City, NJ (US); Ashwin Roongta, East Brunswick, NJ (US); Sayan Banerjee, Marlboro, NJ (US)

(73) Assignee: Bank of America Corporation, Charlotte, NC (US)

( * ) Notice: Subject to any disclaimer, the term of this patent is extended or adjusted under 35 U.S.C. 154(b) by 126 days.

(21) Appl. No.: 16/211,378

(22) Filed: Dec. 6, 2018

(65) Prior Publication Data
US 2020/0184007 A1    Jun. 11, 2020

(51) Int. Cl.
*G06F 17/00*    (2019.01)
*G06F 40/174*    (2020.01)
*G06F 16/31*    (2019.01)

(52) U.S. Cl.
CPC .......... *G06F 40/174* (2020.01); *G06F 16/316* (2019.01)

(58) Field of Classification Search
CPC .............................. G06F 40/174; G06F 16/316
See application file for complete search history.

(56) References Cited

U.S. PATENT DOCUMENTS

| | | | | |
|---|---|---|---|---|
| 10,686,772 | B2 * | 6/2020 | Haddad | H04L 63/08 |
| 2001/0054046 | A1 * | 12/2001 | Mikhailov | G06F 40/174 |
| | | | | 715/221 |
| 2008/0046807 | A1 * | 2/2008 | Margitich | H04L 51/18 |
| | | | | 715/222 |
| 2017/0220546 | A1 | 8/2017 | Codrington et al. | |
| 2018/0144314 | A1 * | 5/2018 | Miller | G06Q 20/14 |

(Continued)

OTHER PUBLICATIONS

Malhotra K., Medhekar S., Navathe S.B., Laborde M.D.D. (2014) Towards a Form Based Dynamic Database Schema Creation and Modification System. In: Jarke M. et al. (eds) Advanced Information Systems Engineering. CAiSE 2014. Lecture Notes in Computer Science, vol. 8484. Springer, Cham (Year: 2014).*

(Continued)

*Primary Examiner* — Syed H Hasan
(74) *Attorney, Agent, or Firm* — Weiss & Arons LLP; Michael A. Springs, Esq.

(57) ABSTRACT

A database management system for processing large volumes of data in a key-value store database is provided. The system may be configured to receive a plurality of filled fillable request forms where each request form may include a request including a plurality of field labels and a plurality of fillable text fields corresponding to each of the plurality of the field labels. The system may be configured to extract each set of inputted data from each fillable text field. The system may be configured to store, in the key-value store database, for each request form, each of the plurality of field labels and the corresponding set of inputted data as a combination key-value pair. The combination key may be equal to a WIP ID number, form ID number and field ID number. The corresponding value may be equal to the set of data of the corresponding field ID number.

20 Claims, 6 Drawing Sheets

(56) References Cited

U.S. PATENT DOCUMENTS

2020/0074169 A1* 3/2020 Mukhopadhyay .......................... G06K 9/00449
2020/0160050 A1* 5/2020 Bhotika ............. G06K 9/00449

OTHER PUBLICATIONS

Abraham, Nikhil, "Coding Jobs for Storing Data in SQL and NOSQL Databases," https://www.dummies.com/careers/find-a-job-/coding-obs-for-storing-data-in-sql-and-nosql-databases/, Retrieved on Oct. 16, 2018.
"What is NoSQL?" https://www.mongodb.com/nosql-explained, Retrieved on Oct. 11, 2018.
"NoSQL," https://en.wikipeda.org/wiki/NoSQL, Wikimedia Foundation, Inc., Oct. 23, 2018.
Issac, Luke P., "SQL vs NoSQL Database Differences Explained with Few Example DB,", https://www.thegeekstuff.com/2014/01/sql-vs-nosql-db, Jan. 14, 2014.

* cited by examiner

EDOC UTILITY USING NON-STRUCTURED-QUERY-LANGUAGE DATABASES

FIELD OF TECHNOLOGY

Aspects of the invention relate to storing form related data in a key-value store database.

BACKGROUND OF THE DISCLOSURE

Large entities and organizations distribute and process numerous forms daily. Each entity and organization may have various types of forms for each division within their entity. Existing clients of an entity, as well as new clients of an entity may be filling out these forms. Forms may be retrieved at a brick and mortar location and filled in manually. Forms may be accessed online and filled in electronically.

Whether the form is filled out by hand or electronically, the forms may then require entering the data into the system. Conventionally, data within forms are electronically entered into the entity's system and stored in a relational-type database. Relational databases may store the data in tables. Tables may include a large plurality of rows and columns. Numerous tables may each be linked to one another. The tables may be linked to, and associated with, primary keys and foreign keys.

When a client's data is changed and/or when new fields are added or deleted from a form, the entire database may need to be altered. Furthermore, as the volume of data being stored increases, the server may not have sufficient space and may require a more powerful server to handle the data.

For large entities and organizations that may need to modify their forms frequently and may process large dynamic datasets, it may be desirable to store the data in a non-structured-query-language ("NoSQL") database.

It would be desirable, therefore, to provide systems and methods to store data in a key-value store database which enables adding and modifying data in forms in real-time, preferably without the need to alter the entire database system.

SUMMARY OF THE DISCLOSURE

A database management system that processes data in a key-value store database on a server is provided. The database management system preferably enables a database manipulation scheme for use with fillable forms.

The system may include computer executable instructions. When run on a processor, the instructions are configured to receive an at least partially filled fillable request form. The request form may include a request. The request form may include a plurality of field labels and a plurality of preferably filled fillable text fields. Each fillable text field preferably corresponds to one of the plurality of the field labels. Each filled fillable text field includes a set of inputted data.

The instructions may be further configured to extract each set of inputted data from each fillable text field within the request form. The instructions may also be configured to assign a work-in-progress ("WIP") ID number for the request, a form ID number, where the form ID number is preferably a number based on a type of fillable request form submitted and a field ID number for each of the field labels.

The instructions may also be configured to store, in the key-value store database, each of the plurality of field labels and the set of inputted data within the corresponding fillable text field as a key-value pair. Each key-value pair may be independent of another key-value pair. Each key-value pair may include a combination key and a corresponding value.

In certain embodiments, for each key-value pair, the combination key may be equal to a combination of the WIP ID number, the form ID number and the field ID number. Also for each key-value pair the corresponding value may be equal to the set of inputted data within the fillable text field corresponding to the field ID number.

In some embodiments, each set of inputted data includes one or more numeric characters, alphabetical characters, special characters and/or images. The system may be configured to validate the characters within each set of inputted data.

In certain embodiments, the fillable request form may be a first request form. The system may be further configured to, in the event that a second or subsequent request form is received for the same request, overwrite the first request form. The overwriting may include maintaining the combination key for each key-value pair and updating the corresponding value for each combination key.

In the event that the second or subsequent request form received for the same request includes one or more new field labels and one or more corresponding new fillable text fields including a set of inputted data, the system may further be configured to add in real-time, to the key-value store database, each of the one or more new field labels and the corresponding set of inputted data as a key-value pair. Because the data from the forms are stored as a key-value pair, inserting, searching and modifying data may be performed instantly.

The database management system may also be configured to store the key-value pairs in a data structure. The data structure may include one or more of an array, graph, list and/or hash-based structure.

In certain embodiments, the system may be configured to handle the complexity that may be associated with the receipt of multiple copies of the same form type received for the same WIP ID number. The system may be configured to handle and resolve collisions that may occur due to the receipt of multiple copies of the same form type. The collisions may be resolved based on a hierarchy. The system may be configured to take different pathways based on the differences of data within each of the multiple copies. In certain instances, the system may retrieve and store a most recently dated form and delete the other forms. In other instances, the system may select one of the multiple copies of forms based on a pre-set hierarchy. The system may be configured to compare the multiple copies and make a determination for the most correct form based on the sets of inputted data included in the text fields. The system may retrieve and store the form, within the multiple forms, that is the most complete.

In some embodiments, the filled fillable form may be an electronically filled fillable form. When the filled fillable form is a manually filled fillable form, the system may be configured to, upon receipt of the form, digitize the form. Digitizing the form may include converting the form into an acceptable format for further digital processing.

In certain embodiments, the fillable form is a wire-transfer-profile ("WTP") form. The WTP form may include an account number field-label and a corresponding account number fillable text-field, one or more field labels and corresponding fillable text fields relating to the account number, one or more authorized parties field labels and one or more corresponding authorized parties fillable text-fields, one or more field labels corresponding fillable text fields relating to the authorized parties names, and/or a signature field-label and a corresponding signature fillable text-field.

For embodiments involving a WTP form, the system may also include a WTP validator. The WTP validator may be configured to, in response to receipt of the WTP form, verify that for each inputted authorized party, at least one of the plurality of related fillable text fields includes a set of inputted data. In the event that at least one set of inputted data is not included in the at least one authorized party related fillable text field, the WTP validator does not verify the authorized party related fillable text field to include the set of inputted data. In such circumstances, the system may be configured to deny the request.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
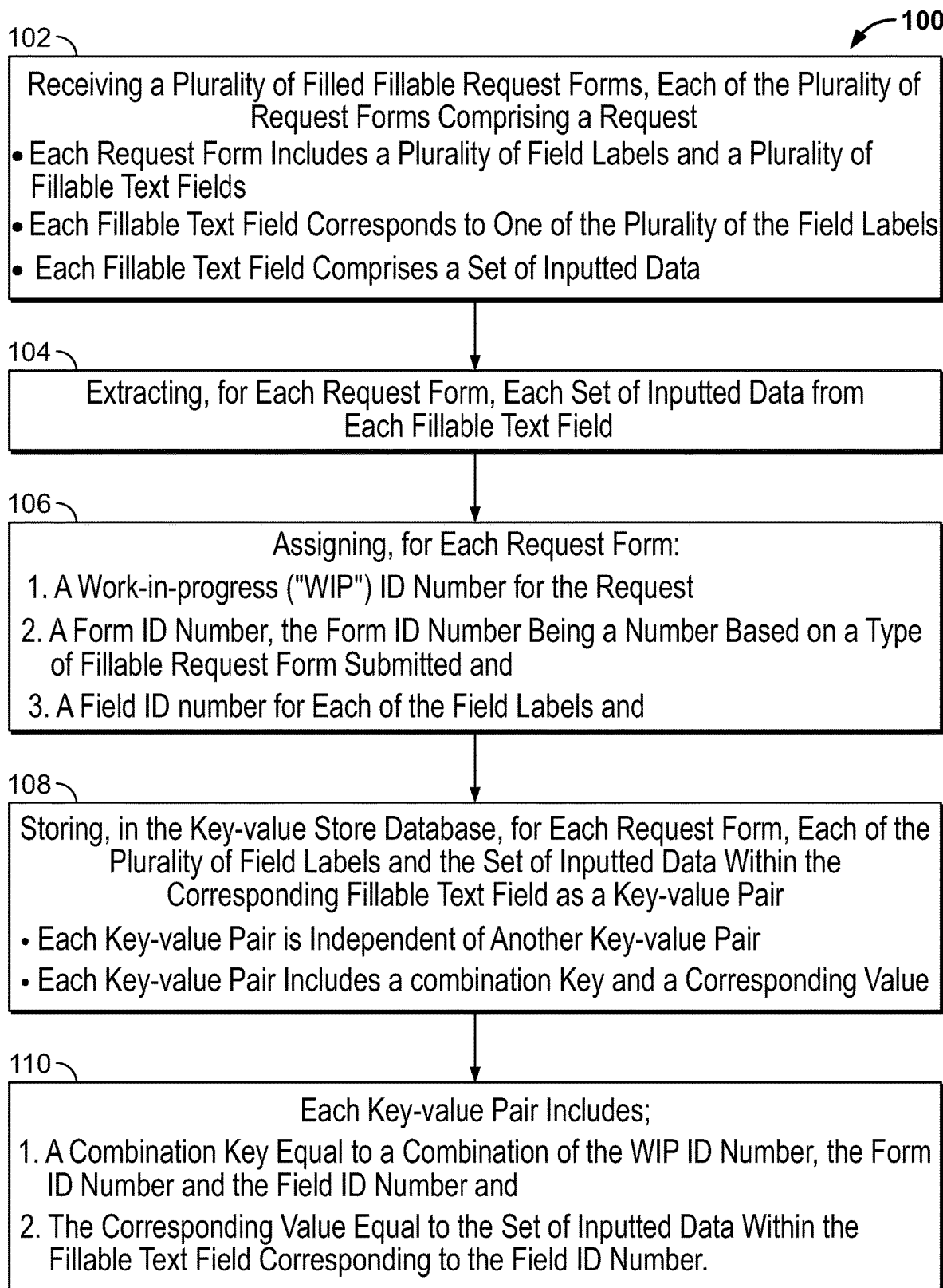
FIG. 1 shows an illustrative flow diagram in accordance with principles of the invention.

Non-structured-query-language ("NoSQL") databases may include different variants of storage systems. A key-value store database may be a type of NoSQL database. A key-value store database may be a very simple storage system. Each key-value pair may be indexed via the key. Each key-value may be queried by the key. This may enable read and write operations to be performed at a very fast speed. This may also enable speedy access to long-term data that may be accessed by the key.

Numerous forms may be received within entities that have many clients. When processing received fillable forms for entities and organizations that have many clients, the amount of data going through the system, and the amount of data requiring storage may be limitless. Using key-value type storage enables a very scalable system. Each key-value pair may be unique and may be independent of another pair. This may enable dynamically inserting new sets of data as well as the ability to modify the data in real-time. This may further enhance server performance including server speed and server response times. Data types, as well as structure of the data may not require to be fixed in advance.

In certain embodiments, one or more methods are described. In one embodiment, a method for storing large volumes of data received from a plurality of dynamic fillable forms is provided. The large volumes of data may be stored in a key-value type database on a server.

Key-value type databases that may be used within the scope of the invention may be Apache HBase™, as well as other suitable NoSQL database systems.

The method may include receiving a plurality of filled fillable request forms. Each of the plurality of request forms may include a request. Each request form may also include a plurality of field labels and a plurality of fillable text fields. Each fillable text field may correspond to one of the plurality of the field labels. Each fillable text field may include a set of inputted data.

The method may further include extracting, for each request form, each set of inputted data from each fillable text field. Also, the method may include assigning, for each request form, the following information. The method may assign a work-in-progress ("WIP") ID number for the request. The method may also assign a form ID number. For the purposes of this application, the form ID number may be considered a number based on a type of fillable request form submitted. The method may also assign a field ID number for each of the field labels.

The method may store, in the key-value store database, for each request form, each of the plurality of field labels and the set of inputted data within the corresponding fillable text field as a key-value pair. Each key-value pair may include a combination key and a corresponding value. Each key-value pair may be independent of another key-value pair. For each key-value pair, the combination key may preferably be equal to a combination of the WIP ID number, the form ID number and the field ID number. Also, for each key-value pair the corresponding value may be equal to the set of inputted data within the fillable text field corresponding to the field ID number.

In certain embodiments, in the event that there is insufficient storage space on the server for the large volumes of data, the method may further include adding one or more additional servers and storing one or more segments of the large volumes of data on the one or more additional servers. The one or more segments of the large volumes of data may be stored on the additional servers in a manner that is independent from the data stored on the original server.

It should be noted that the adding of one or more additional servers may further include automatically spreading and storing the data horizontally across the one or more additional servers. Such horizontal expansion is within the scope of the invention. When more servers are added, server performance may be enhanced. It may not be necessary to use colossal size servers for storing data, as may be necessary when computing in relational-type database systems. In accordance with embodiments of the invention, additional servers may constantly be added, in real-time, for storing form data. Architectures for storing data in key-value type data stores, within the scope of the invention, may enable using commodity servers, cloud computing and open source software as well for storing data associated with the forms.

In the event that one of the pluralities of received request forms is the same request as a request in a previously submitted request form, the method may further include overwriting the previously submitted request form of the same request.

In some embodiments, the method may also include determining whether there are one or more new field labels and one or more corresponding new fillable text fields within the received request form. In response to such a determination, the method may include adding to the key-value store database each of the one or more new field labels and the corresponding set of inputted data as a new key-value pair. In addition, the adding may be preferably performed in real-time such that the adding of the one or more new key-value pairs occurs without any substantive delay. Such a substantive delay may be considered a delay that causes a noticeable slowing of the storage process.

In other embodiments, a database management system for processing large volumes of data in a key-value store database on a server may be provided. The database management system may enable a database manipulation scheme for use with dynamic fillable forms. The system may include computer executable instructions that, when run on a processor, are configured to receive a plurality of filled fillable request forms. Each of the plurality of request forms may include a request. Each request form may include a plurality of field labels and a plurality of fillable text fields. Each fillable text field may correspond to one of the plurality of the field labels. Each fillable text field may include a set of inputted data.

In response to the receipt of the plurality of request forms, the system may be configured to extract, for each request form, each set of inputted data from each fillable text field.

The system may be further configured to assign, for each request form, a work-in-progress ("WIP") ID number for the request, a form ID number, the form ID number being a number based on a type of fillable request form submitted and a field ID number for each of the field labels.

The system may also be configured to store, in the key-value store database, for each request form, each of the plurality of field labels and the set of inputted data within the corresponding fillable text field as a key-value pair. Each key-value pair may be independent of another key-value pair. Each key-value pair may include a combination key and a corresponding value.

For each key-value pair, the combination key is equal to a combination of the WIP ID number, the form ID number and the field ID number. The corresponding value may be equal to the set of inputted data within the fillable text field corresponding to the field ID number.

Illustrative method steps may be combined. For example, an illustrative method may include steps shown in connection with another illustrative method or another method described herein.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative flow diagram of a method 100. Method 100 may be a method for storing data received from a plurality of forms within a key-value type database in accordance with principles of the invention.

At step 102, the method may include receiving a plurality of filled fillable request forms. The forms may include a request. The request may be a request associated with the entity and/or organization that may be receiving the form. Each request form may include a plurality of field labels. Each label may be a question on the form. Each field label may include a corresponding text field for the answer to the question. Upon receipt of the form, the text field may include a set of inputted data, which may have been inputted by a requestor. The set of inputted data may be the answer to the question.

At step 104, the method may include extracting each set of inputted data. The inputted data extracted may be from each fillable text field for each request form.

At step 106, the method may include assigning a plurality of ID numbers associated with the form. The method may include assigning a work-in-progress ("WIP") ID number for the request. The method may also include assigning a form ID number based on the type of request form being received. The method may also include assigning a field ID number for each field label.

At step 108, the method may include storing in the key-value store database, for each request form, each of the plurality of field labels and the set of inputted data within the corresponding text field, as a key-value pair. Each key-value pair may be preferably independent of another key-value pair. Each key-value pair may include a combination key and a corresponding value.

At step 110, the method may include storing a combination key together with its corresponding value as the key-value pair. The combination key may be equal to a combination of the WIP ID number, the form ID number and the field ID number. The value may be equal to the set of inputted data within the text field corresponding to the field ID number.

Figure 2:
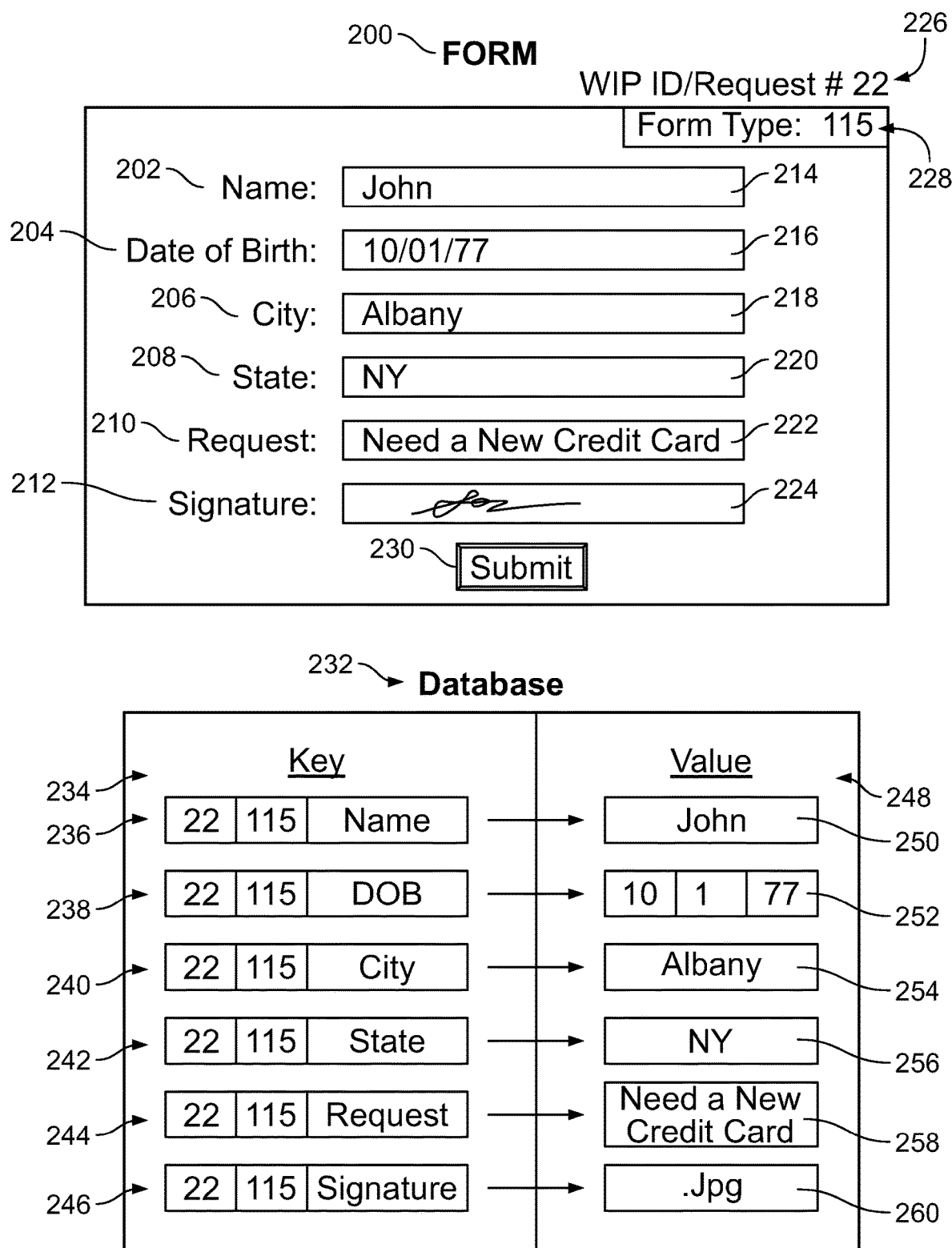
FIG. 2 shows an exemplary diagram in accordance with principles of the invention.

FIG. 2 shows an exemplary diagram of a form 200 and the key-value type database 232 for storing the form, in accordance with principles of the invention. Form 200 may be a form associated with an entity. Form 200 may be a form associated with an organization. Every entity and/or organization may have numerous types of forms and variants of forms for each division within the entity.

In this exemplary diagram, form 200 may be a request form within a financial entity for requesting a new credit card. Form 200 is an electronic fillable form. Forms may be filled out manually by a client at any brick and mortar location. The client may fill out the form and the entity may then upload it to their database management system. The system may then digitize the form in order to extract and store the data.

Form 200 may include a plurality of field labels and corresponding fillable text fields. Field label 202 may be a label for a name. The user of the form, in this exemplary form 200, is named John. The set of data included in the fillable text field 214 is 'John.' Field label 204 may be a label for a date of birth associated with the user. Fillable text-field 216 may include the set of data '10/01/77' as the date of birth. Field-label 206 may be a field-label for a city where the user resides. Fillable text-field 218 may include 'Albany' as the city associated with the user. Field-label 208 may be a state where the user resides. Fillable text-field 220 may include 'NY' as the state associated with the user. Field-label 210 may be a label for a request the user is attempting to request on the form. Fillable text-field 222 may include the request of the user. The user, in this example, may input 'need a new credit card' as the request. Field-label 212 may be a label for a signature from the user. The user may manually or digitally input the signature. The signature may be inputted at fillable text-field 224. The user may then submit the form at submit button 230.

In response to the submission of the form 200, a database management system may be configured to process and store the data in a key-value store database 232. The system may be configured to assign a WIP ID number to form 200. The WIP ID number for form 200 may be '22.' The system may be further configured to assign a form ID number to form 200. In this exemplary diagram, form 200 includes the form ID number on the form itself and the system may be configured to extract the form ID number from the form. In a different example, the system may be configured to determine the form-type of the form received and assign the form ID number based on the type of form received.

The system may then be configured to extract from form 200, each set of inputted data and its corresponding form-label. The system may then be configured to store each entry including the field label and inputted data in the key-value store database. Each set of inputted data may be stored as the value. The corresponding key may include the WIP ID number 22 and the form ID 115. The key may also include the field-label. The same WIP ID and field ID may be included in each combination key for form 200 along with a different field-label ID for each entry.

Each key within database 232 may be shown at column 234 and the matching value at column 248. Each of combination keys 236, 238, 240, 242, 244 and 246, may be stored as an array including a collection of values. The array may include three memory addresses. The first address may include the WIP ID number '22.' The second address within the array may include the form ID number '115.' The third address may include the field-label. Combination key 236 may include the field-label 'name.' Combination key 236 may point to the corresponding value 248. Value 248 may include the set of data 'John'. Each combination key and corresponding value may be stored individually and may be independent from another key-value pair within the same form.

Combination key 238 may include an array including the same WIP ID '22' and the same form ID '115' and may also include field-label 'DOB.' The corresponding value '10/1/77' may be shown at 252. Combination key 240 may include the same WIP ID '22', the same form ID '115' and may also include field-label 'City.' The corresponding value 'Albany' may be shown at 254.

Combination key 242 may include the same WIP ID '22', the same form ID '115' and may also include field-label 'State.' The corresponding value that combination key 242 may point to includes the data 'NY' as shown at 256. Combination key 244 may include the same WIP ID '22', the same form ID '115' and may also include field-label 'Request.' The corresponding value that combination key 244 may point to includes the data 'need a new credit card' as shown at 258. Combination key 246 may include the same WIP ID '22', the same form ID '115' and may also include field-label 'Signature.' The corresponding value may include the signature of the user, as shown at 260. The signature may be stored as an image in the database. In this exemplary diagram, the signature is stored as a jpg. The system may be configured to store it as, but are not limited to, additional file types including tiff, gif, and pdf.

It should be appreciated that each key-value pair stored in database 232 may be a standalone key-value pair and may be independent of another key-value pair. When the form is modified in the future and/or when the user resubmits this form due to modification, the database may be enabled to make the changes in real-time and may not require pausing the system to add new fields and/or changes to the fields or the inputted data.

Figure 3:
FIG. 3 shows another exemplary diagram in accordance with principles of the invention.

FIG. 3 shows an exemplary diagram of a wire transfer profile ("WTP") form 300 in accordance with principles of the invention. It should be appreciated that embodiments of the invention are not limited to WTP forms and may be scalable to be used with numerous other form types including account workflow and other various forms that may be associated with a client. Form 300 may be a form a client of a financial entity. The client may be filling out the form to create a user-profile for enabling wire transfers associated with the client.

WTP form 300 may be a form a client may be accessing via a mobile device, as shown at 316. WTP forms, as well as any form, may be accessed via a mobile device, the internet, as well as in a brick and mortar location. WTP form 300 may not include, in this exemplary form, all the fields typically included.

Section 302 may be directed to details associated with the bank/financial institution the user may be associated with. Section 304 may be directed to details associated with each account the client may request a wire transfer to be associated with.

Section 306 may be for providing details relating to one or more authorized representatives that may be authorized to initiate the wire transfers. Details of one authorized representative may be filled in at section 308. Details of a second authorized representative may be shown at 310. Each representative must include at least one attribute field to be filled in associated with the representative. The at least one attribute field may include either the tax payer identification ("TIN") number, the Government ID number, date of birth, or full legal address. The client may submit the WTP form 300 at submit button 314.

Figure 4:
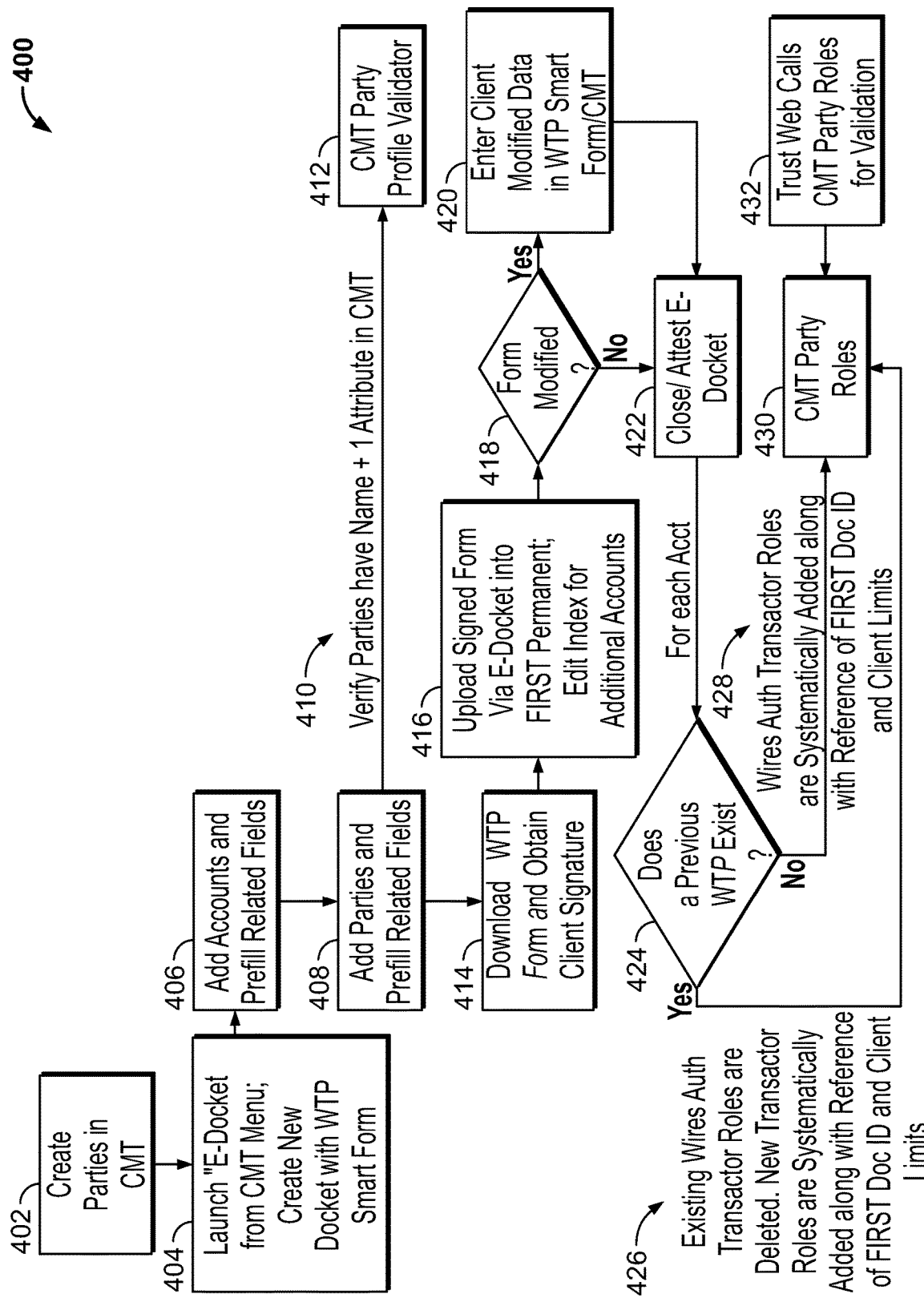
FIG. 4 shows another illustrative flow diagram in accordance with principles of the invention.

FIG. 4 shows an illustrative flow diagram of a database management process 400 for processing the WTP from 300 described in FIG. 3. Process 400 may process WTP form 300 and store the data in a key-value store database. Client maintenance tool ("CMT") may be the database management application being used in association with this illustrative flow diagram. At step 402, one or more authorized parties associated with a wire transfer profile may be created and entered into a CMT.

At step 404, an electronic docket ("e-docket") may be launched from the CMT menu. The e-docket may be a new docket set up for each client creating a WTP. The new docket may entail the completion of the WTP smart form, as shown in FIG. 3. At step 406, each financial account number and the associated details, for the client may be entered into the WTP form. The associated details of the account numbers may be pre-filled based on previously stored data associated with the client. At step 408, details associated with the one or more authorized parties authorizing the wire transfers may be entered. The associated details of the authorized parties may be pre-filled based on previously stored data.

At step 414, the WTP form may be downloaded and printed for signature. In certain embodiments, the signature may be added electronically without the need to download the form. Prior to step 416, the details associated with the authorized parties may require validation. At step 412, a CMT party profile validator may verify that for each inputted authorized party, at least one associated detail has been inputted, as shown at 410. The CMT may deny submission of the WTP form if the CMT party profile validator has not successfully verified an associated detail inputted into the form.

When the CMT validator has successfully verified entry of an associated detail to the one or more inputted authorized parties, the WTP form may be successfully uploaded into the CMT. The form may be stored in a permanent repository and the CMT may edit an index for additional accounts.

The CMT may assign a WIP ID number and a field ID number for the WTP form uploaded. The CMT may be configured to store each field-label, shown in FIG. 3, and its associated input entry, as a key-value pair. The CMT may at first determine whether the uploaded form is a modification of a previous form already submitted, as shown at step 418. Upon determination that the form was modified, step 420 may be performed. Since the CMT stores the data in a key-value type database, the CMT may be enabled to modify the value of an already stored key-value based on the modified data received in the uploaded WTP form, as shown at step 420. Following modification, the e-docket may be closed/attested as shown at step 422. In the event that the form is not determined to be modified, step 422 may follow step 418 and the e-docket may be closed/attested.

At step 424, for each account, the CMT may determine if a previous WTP exists. If a previous WTP exists, step 426 may be performed. At step 426 existing wires authentication transactor roles are deleted. Previously authorized parties may be removed from the profile and new transactor roles may be systematically added along with a reference of a first document ID and client limits. The client limits may be a limit of an amount the client may be enabled to send and/or receive in a wire transfer. Client limits set in the previous WTP form may not need to be updated as done the authorized parties.

At step 430, the CMT may be configured to add the party roles to the profile. The party roles may be based on the details associated with the listed authorized parties. In the event that a previous WTP does not exist, step 428 may be performed. At step 428, wires authentication transactor roles are systematically added along with reference of a first document ID and client limits. The transactor roles may include the authorized parties received on the WTP form. Following step 428, CMT party roles may be assigned and stored as shown at step 430. Prior to storing the roles for each authorized party, step 432 may be performed. At step 432, a trusted web system may validate the authorized parties and the roles assigned to the trusted party.

Figure 5:
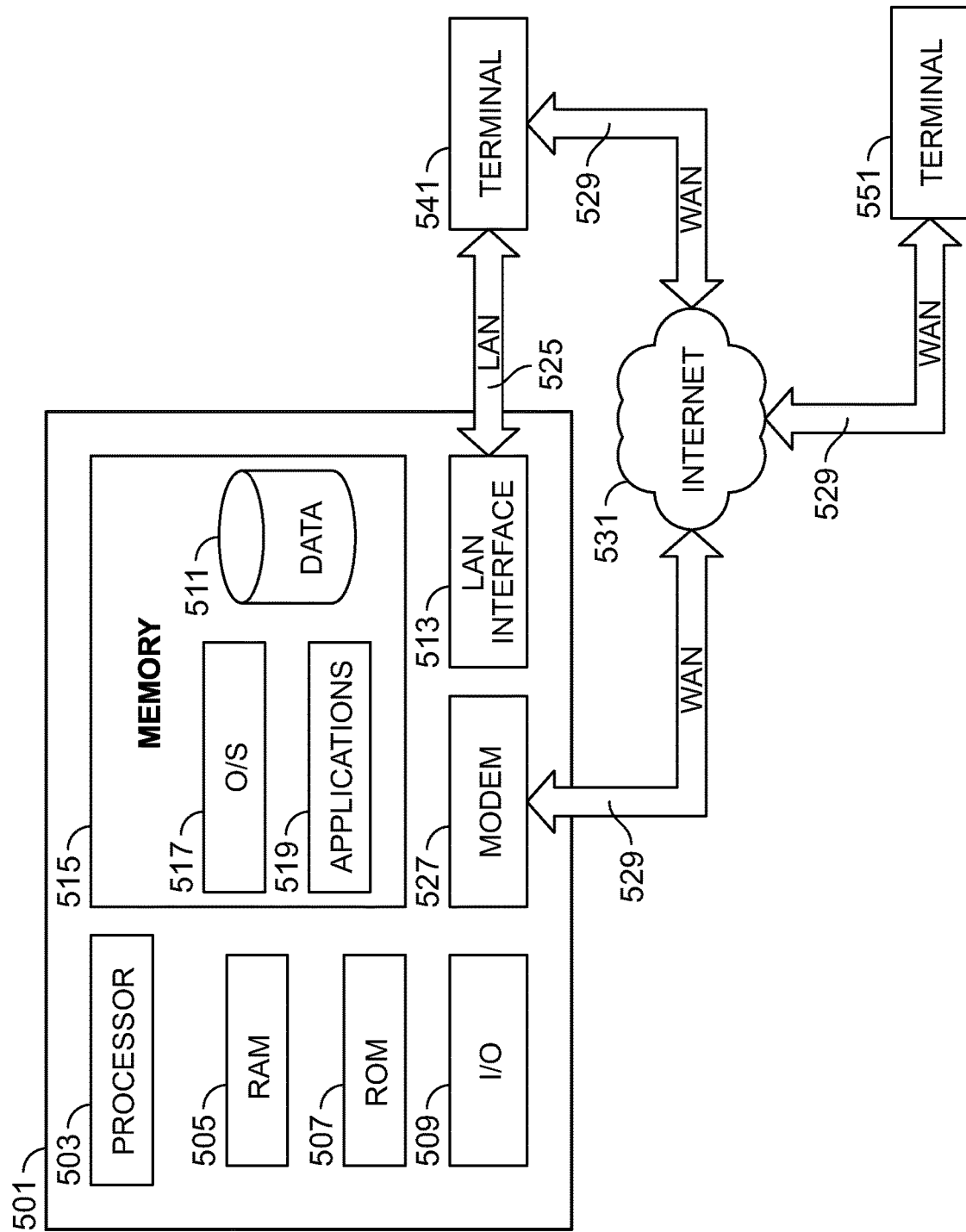
FIG. 5 shows an illustrative block diagram in accordance with principles of the invention.

FIG. 5 shows an illustrative block diagram of system 500 that includes computer 501. Computer 501 may alternatively be referred to herein as a "server" or a "computing device." Computer 501 may be a desktop, laptop, tablet, smartphone, smart-watch, or any other suitable computing device.

Computer 501 may have a processor 503 for controlling the operation of the device and its associated components, and may include RAM 505, ROM 507, input/output ("I/O") module 509, and a memory 515. The processor 503 may also execute some or all software running on the computer—e.g. the operating system and/or voice recognition software. Other components commonly used for computers, such as EEPROM or Flash memory or any other suitable components, may also be part of the computer 501.

The memory 515 may be comprised of any suitable permanent storage technology—e.g., a hard drive. The memory 515 stores software including the operating system 517 any application(s) 519 along with any data 511 needed for the operation of the system 500. Memory 515 may also store videos, text, and/or audio files. The videos, text, and/or audio files may also be stored in cache memory, or any other suitable memory. Alternatively, some or all of computer executable instructions may be embodied in hardware or firmware (not shown). The computer 1001 may execute the instructions embodied by the software to perform various functions.

Input/output ("I/O") module may include connectivity to a microphone, keyboard, touch screen, mouse, and/or stylus through which a user of computer 501 may provide input. The input may include input relating to cursor movement. The input may be included in a transfer event or an escape event. The input/output module may also include one or more speakers for providing audio output and a video display device for providing textual, audio, audiovisual, and/or graphical output. The input and output may be related to computer application functionality.

System 500 may be connected to other systems via a local area network (LAN) interface 1013.

System 500 may operate in a networked environment supporting connections to one or more remote computers, such as terminals 541 and 551. Terminals 541 and 551 may be personal computers or servers that include many or all of the elements described above relative to system 500. The network connections depicted in FIG. 5 include a local area network (LAN) 525 and a wide area network (WAN) 529, but may also include other networks. When used in a LAN networking environment, computer 501 is connected to LAN 525 through a LAN interface or adapter 513. When used in a WAN networking environment, computer 501 may include a modem 527 or other means for establishing communications over WAN 529, such as Internet 531.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server.

The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory. The transmission of the data together with computer-readable instructions may enable the computer system to quickly retrieve the data, when needed. Because the computer system is able to quickly retrieve the data, the web-based server may not need to stream the data to the computer system. This may be beneficial for the computer system, because the retrieval may be faster than data-streaming. Users may not become frustrated because they do not need to wait to run the applications. Conventionally, streaming data requires heavy usage of the processor and the cache memory. If the data is stored in the computer system's memory, retrieval of the data may not require heavy processor and cache memory usage. Any of various conventional web browsers can be used to display and manipulate retrieved data on web pages.

Additionally, application program(s) 519, which may be used by computer 501, may include computer executable instructions for invoking user functionality related to communication, such as e-mail, Short Message Service (SMS), and voice input and speech recognition applications. Application program(s) 519 (which may be alternatively referred to herein as "applications") may include computer executable instructions for searching, manipulating, and/or displaying graphs.

Computer 501 and/or terminals 541 and 551 may also be devices including various other components, such as a battery, speaker, and antennas (not shown).

Terminal 551 and/or terminal 541 may be portable devices such as a laptop, cell phone, Blackberry™, tablet, smartphone, or any other suitable device for receiving, storing, transmitting and/or displaying relevant information. Terminals 551 and/or terminal 541 may be other devices.

These devices may be identical to system 500 or different. The differences may be related to hardware components and/or software components.

Any information described above in connection with database 511, and any other suitable information, may be stored in memory 515. One or more of applications 519 may include one or more algorithms that may be used to implement services relating to searching, manipulating, and/or displaying graphs.

The systems and methods of the disclosure may be operational with numerous other general purpose or special purpose computing systems, environments, or configurations. Examples of well-known computing systems, environments, and/or configurations that may be suitable for use with the disclosure include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The systems and methods of the disclosure may be described in the general context of computer-executable instructions, such as program modules, being executed by a computer. Generally, program modules include routines, programs, objects, components, data structures, etc. that perform particular tasks or implement particular abstract data types. The systems and methods may also be practiced in distributed computing environments where tasks are performed by remote processing devices that are linked through a communications network. In a distributed computing environment, program modules may be located in both local and remote computer storage media including memory storage devices.

Figure 6:
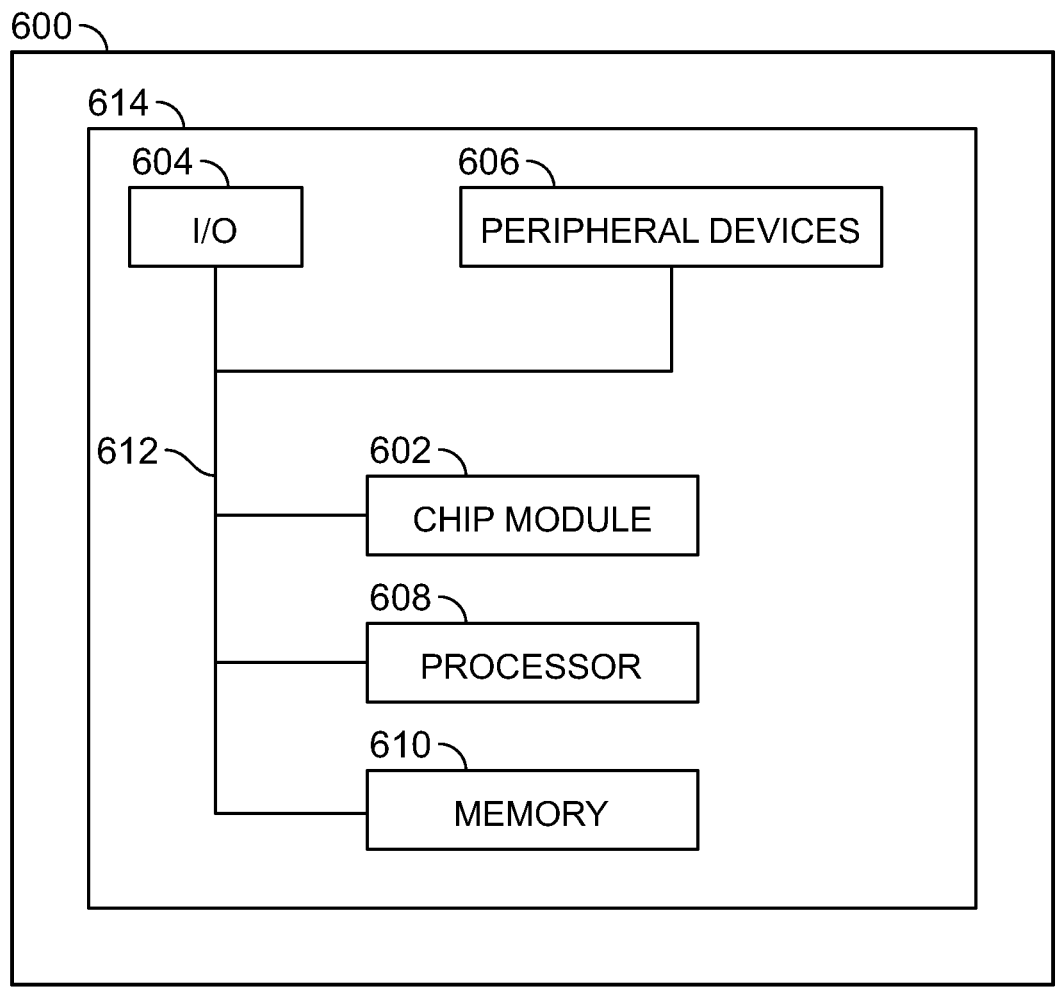
FIG. 6 shows an illustrative apparatus in accordance with principles of the invention.

FIG. 6 shows illustrative apparatus 600 that may be configured in accordance with the principles of the disclosure. Apparatus 600 may be a computing machine. Apparatus 600 may include one or more features of the apparatus shown in FIG. 6. Apparatus 600 may include chip module 602, which may include one or more integrated circuits, and which may include logic configured to perform any other suitable logical operations.

Apparatus 600 may include one or more of the following components: I/O circuitry 604, which may include a transmitter device and a receiver device and may interface with fiber optic cable, coaxial cable, telephone lines, wireless devices, PHY layer hardware, a keypad/display control device or any other suitable media or devices; peripheral devices 606, which may include counter timers, real-time timers, power-on reset generators or any other suitable peripheral devices; logical processing device 608, which may compute data structural information and structural parameters of the data; and machine-readable memory 610.

Machine-readable memory 610 may be configured to store in machine-readable data structures: machine executable instructions (which may be alternatively referred to herein as "computer code"), applications, signals, and/or any other suitable information or data structures.

Components 602, 604, 606, 608 and 610 may be coupled together by a system bus or other interconnections 612 and may be present on one or more circuit boards such as 614. In some embodiments, the components may be integrated into a single chip. The chip may be silicon-based.

Database management systems, within the scope of the invention, may include apparatus shown in FIG. 6 such as components chip module 602, I/O circuitry 604, peripheral devices 606, logical processing device 608, machine-readable memory 610, system bus 612 and circuit board 614.

Thus, methods and apparatus for processing and storing data in a key-value type database have been provided. Persons skilled in the art will appreciate that the present invention can be practiced by other than the described embodiments, which are presented for purposes of illustration rather than of limitation. The present invention is limited only by the claims that follow.

What is claimed is:

1. A database management system for processing data in a key-value store database on a server, the database management system enabling a database manipulation scheme for use with fillable forms, the system comprising computer executable instructions that, when run on a processor, are configured to:
   receive a filled fillable request form, the request form comprising a request, the request form comprising a plurality of field labels and a plurality of fillable text fields, each fillable text field corresponding to one of the plurality of the field labels, wherein each fillable text field comprises a set of inputted data;
   extract each set of inputted data from each fillable text field within the request form;
   assign:
      a work-in-progress ("WIP") ID number for the request;
      a form ID number, the form ID number being a number based on a type of fillable request form submitted; and
      a field ID number for each of the field labels; and
   store, in the key-value store database, each of the plurality of field labels and the set of inputted data within the corresponding fillable text field as a key-value pair, each key-value pair is independent of another key-value pair, wherein each key-value pair comprises a combination key and a corresponding value;
   wherein, for each key-value pair:
      the combination key is equal to a combination of the WIP ID number, the form ID number and the field ID number; and
      the corresponding value is equal to the set of inputted data within the fillable text field corresponding to the field ID number.

2. The database management system of claim 1 wherein each set of inputted data comprises one or more numeric characters, alphabetical characters, special characters and/or images.

3. The database management system of claim 1 wherein the fillable request form is a first request form and the system is further configured to, in the event that a second or subsequent request form is received for the same request, overwrite the first request form, the overwriting comprising:
   maintaining the combination key for each key-value pair; and
   updating the corresponding value for each combination key.

4. The database management system of claim 3 wherein in the event that the second or subsequent request form received for the same request includes one or more new field labels and one or more corresponding new fillable text fields comprising a set of inputted data, the system is further configured to add in real-time, to the key-value store database, each of the one or more new field labels and the corresponding set of inputted data as a key-value pair.

5. The database management system of claim 1 wherein the system is configured to store the key-value pairs in a data structure, the data structure comprising one or more of an array, graph, list and and/or hash-based structure.

6. The database management system of claim 1 wherein the filled fillable form is an electronically filled fillable form.

7. The database management system of claim 1 wherein the filled fillable form is a manually filled fillable form and the system is configured to upon receipt of the form, digitize the form.

8. The database management system of claim 1 wherein the fillable form is a wire-transfer-profile ("WTP") form.

9. The database management system of claim 3 wherein the WTP form comprises:
  an account number field-label and a corresponding account number fillable text-field;
  one or more field labels and corresponding fillable text fields relating to the account number;
  one or more authorized parties field labels and one or more corresponding authorized parties fillable text-fields;
  one or more field labels and corresponding fillable text fields relating to the authorized parties names; and
  a signature field-label and a corresponding signature fillable text-field.

10. The database management system of claim 9 further comprising a WTP validator, the WTP validator configured to, in response to receipt of the WTP form:
  verify that for each inputted authorized party, at least one of the plurality of related fillable text fields includes a set of inputted data, wherein in the event that at least one set of inputted data is not included in at least one authorized party related fillable text field, the system is configured to deny the request.

11. A method for storing large volumes of data received from a plurality of dynamic fillable forms, the large volumes of data being stored in a key-value type database on a server, the method comprising:
  receiving a plurality of filled fillable request forms, each of the plurality of request forms comprising a request, each request form comprising a plurality of field labels and a plurality of fillable text fields, each fillable text field corresponding to one of the plurality of the field labels, wherein each fillable text field comprises a set of inputted data;
  extracting, for each request form, each set of inputted data from each fillable text field;
  assigning, for each request form:
    a work-in-progress ("WIP") ID number for the request;
    a form ID number, the form ID number being a number based on a type of fillable request form submitted; and
    a field ID number for each of the field labels; and
  storing, in the key-value store database, for each request form, each of the plurality of field labels and the set of inputted data within the corresponding fillable text field as a key-value pair, each key-value pair is independent of another key-value pair, each key-value pair comprising a combination key and a corresponding value;
  wherein, for each key-value pair:
    the combination key is equal to a combination of the WIP ID number, the form ID number and the field ID number; and
    the corresponding value is equal to the set of inputted data within the fillable text field corresponding to the field ID number.

12. The method of claim 11, wherein in the event that there is insufficient storage space on the server for the large volumes of data, the method further comprises:
  adding one or more additional servers; and
  storing a one or more segments of the large volumes of data on the one or more additional servers, wherein the one or more segments of the large volumes of data stored on the additional servers is independent from the data stored on the server.

13. The method of claim 12 wherein the adding is in real-time for the one or more additional servers.

14. The method of claim 12 wherein the adding of one or more additional servers further comprises automatically spreading and storing the data horizontally across the one or more additional servers.

15. The method of claim 11 wherein, in the event that one of the plurality of received request forms is a same request as a request in a previously submitted request form, the method further comprises overwriting the previously submitted request form of the same request.

16. The method of claim 15 further comprising determining whether there are one or more new field labels and one or more corresponding new fillable text fields within the received request form, the method further comprises, adding to the key-value store database, each of the one or more new field labels and the corresponding set of inputted data as a new key-value pair.

17. The method of claim 16 wherein the adding is in real-time for adding the one or more new key-value pairs.

18. A database management system for processing large volumes of data in a key-value store database on a server, the database management system enabling a database manipulation scheme for use with dynamic fillable forms, the system comprising computer executable instructions that, when run on a processor, are configured to:
  receive a plurality of filled fillable request forms, each of the plurality of request forms comprising a request, each request form comprising a plurality of field labels and a plurality of fillable text fields, each fillable text field corresponding to one of the plurality of the field labels, wherein each fillable text field comprises a set of inputted data;
  extract, for each request form, each set of inputted data from each fillable text field;
  assign, for each request form:
    a work-in-progress ("WIP") ID number for the request;
    a form ID number, the form ID number being a number based on a type of fillable request form submitted; and
    a field ID number for each of the field labels; and
  store, in the key-value store database, for each request form, each of the plurality of field labels and the set of inputted data within the corresponding fillable text field as a key-value pair, each key-value pair is independent of another key-value pair, each key-value pair comprising a combination key and a corresponding value;
  wherein, for each key-value pair:
    the combination key is equal to a combination of the WIP ID number, the form ID number and the field ID number; and
    the corresponding value is equal to the set of inputted data within the fillable text field corresponding to the field ID number.

19. The system of claim 18, wherein in the event that there is insufficient storage space on the server for the large volumes of data, the system is further configured to:
  add one or more additional servers; and
  store a one or more segments of the large volumes of data on the one or more additional servers, wherein the one or more segments of the large volumes of data stored on the additional servers is independent from the data stored on the server.

20. The system of claim 18 wherein the adding is in real-time for the one or more additional servers.

\* \* \* \* \*